June 12, 1956  S. E. GARUTSO  2,749,820
MEANS OF PRODUCING THREE DIMENSIONAL PHOTOGRAPHIC FILM
Filed Dec. 1, 1952  2 Sheets-Sheet 2
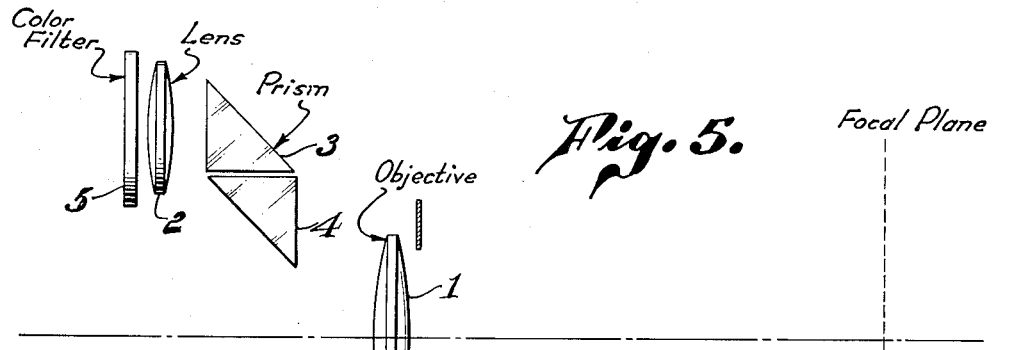
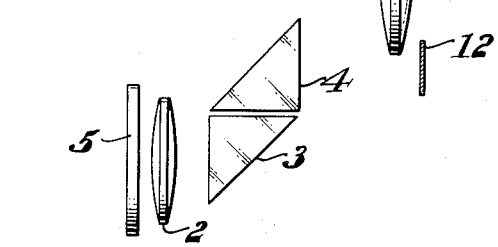
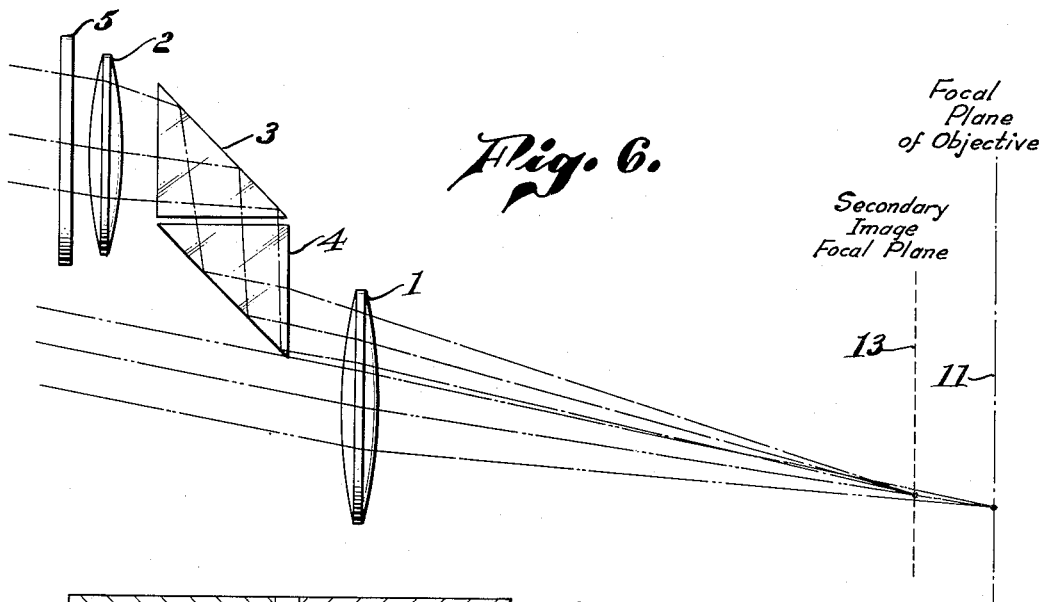
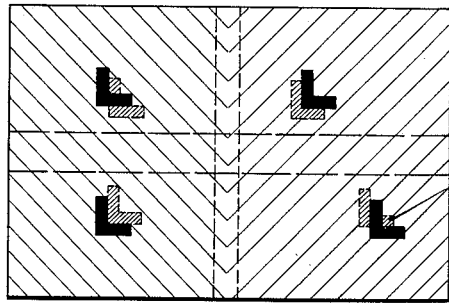
STEPHEN E. GARUTSO,
INVENTOR.
BY
ATTORNEY.

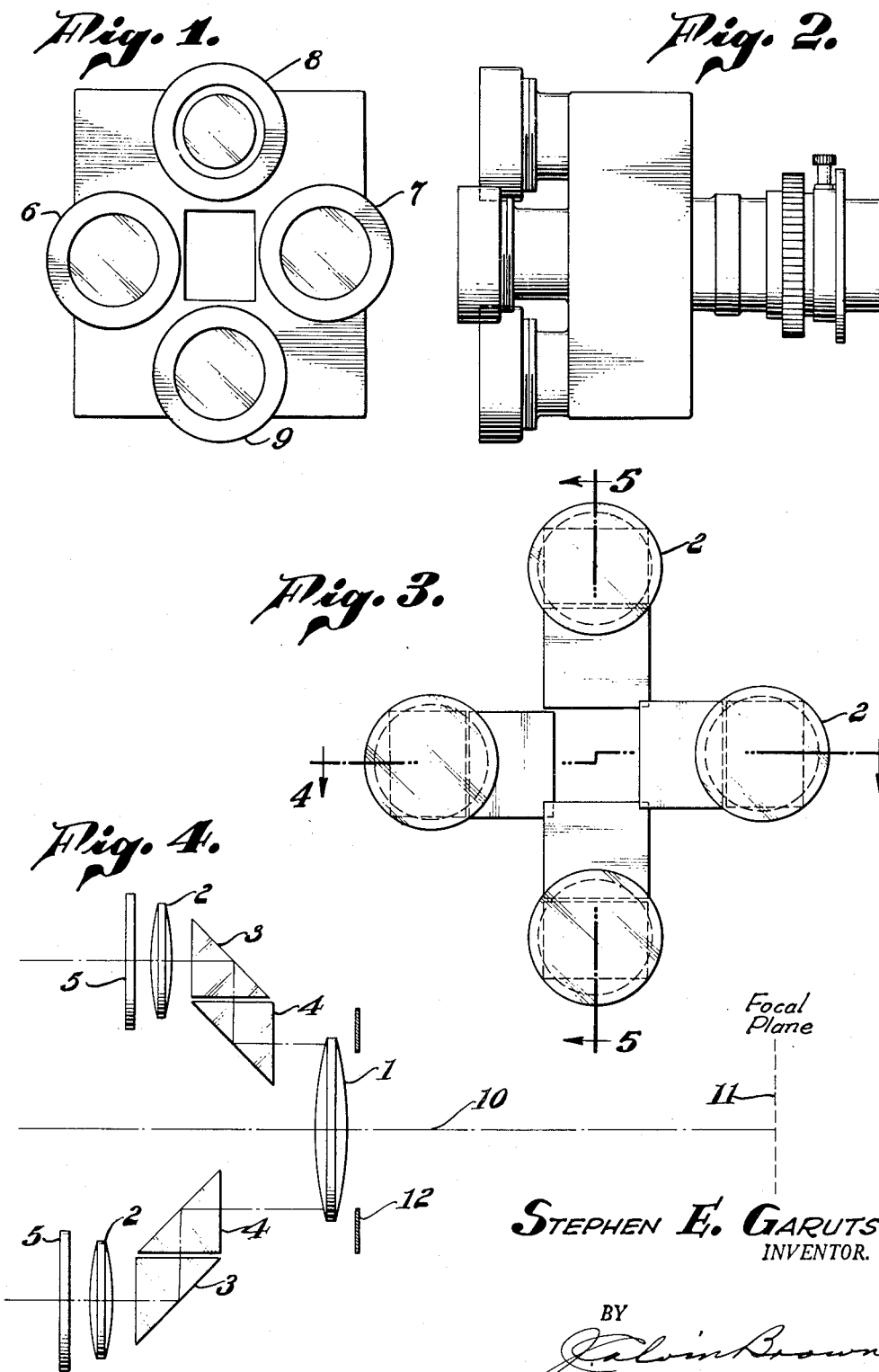

United States Patent Office 2,749,820
Patented June 12, 1956

2,749,820

MEANS OF PRODUCING THREE DIMENSIONAL PHOTOGRAPHIC FILM

Stephen E. Garutso, Hollywood, Calif.

Application December 1, 1952, Serial No. 323,371

3 Claims. (Cl. 95—18)

The present invention relates to three dimensional photography, and contemplates the provision of means adapted to photograph objects in such a manner as to produce a three dimensional negative from which positives may be made. The positives, when projected by any form of projector, will show on a standard screen, objects in true perspective and with depth effects.

I have discovered that a lens system having a plurality of field or secondary lenses, together with a main objective, when properly coordinated as to focal lengths, with the field lenses provided with color means, such as colored filters, forwardly of each field lens, produces a three dimensional effect, particularly when the field lenses produce out-of-focus images in the focal plane of the objective.

I have also discovered that the colored secondary images should be forwardly of and offset relative to the main image at the focal plane of the main objective and that best results are obtained when the light rays from the field lenses are passed through the main objective.

The colored secondary images impart to the main image a sense of separation and roundness in the photographed subject. Further the addition of color removes flatness and gives to the viewer of the projected film, a sense of depth and separation between images of objects at different distances. The multi-secondary images in the practice of the present invention come to the focal plane from different angles, both horizontally and vertically.

An object of the invention is to produce photographs, which when projected, give to the observer a three dimensional effect.

A further object is to produce suitable means for producing separated-image photographs, and which means is comparatively inexpensive to manufacture, does not require specially constructed elements, and which utilizes lenses and color means which are available on the market.

With the above mentioned, and other objects in view, the invention consists in the novel and useful provision, formation, construction, association and relative arrangement of parts, members and features, all as shown in a certain embodiment in the accompanying drawings, described generally, and more particularly pointed out in the claims.

In the drawing:

Figure 1 is a front elevation of the invention, showing four field lenses surrounding the main objective;

Figure 2 is a side elevation of Figure 1, showing the field lenses with the main objective, positioned rearwardly of the field lenses;

Figure 3 is an elevational view showing the field lenses surrounding the main objective together with prisms positioned rearwardly of the field lenses, and with color filters forwardly of the field lenses;

Figure 4 is a sectional view on the line 4—4 of Figure 3, showing the relative position of the horizontal field lenses, with respect to the main objective;

Figure 5 is a sectional view on the line 5—5 of Figure 3, illustrating the relative positions of the vertical field lenses and associated elements;

Figure 6 is a diagrammatic view of one of the field lenses, the main objective and prisms interposed between the field lens and the main objective, with the path of light rays for both the field lens and the objective shown in dotted lines; and Figure 7 is an elevation of the focal plane of the main objective, showing images projected thereon by the main objective, and offset images likewise projected upon the focal plane, as a result of the field lens arrangement shown in Figure 6.

Referring now with particularity to the drawings, I have provided a main objective 1, the form shown in the several figures of the drawings being for illustrative purposes only, and which is of the double convex type.

Forwardly of the main objective 1, is a system of horizontal and vertical field assemblies, each assembly including a field or secondary lens 2, and some means for turning light rays so as to pass the same through the main objective 1. The said means may comprise a pair of right angle prisms 3 and 4, a mirror or other reflecting means, and the assembly likewise includes a filter 5 forwardly of the field lens 2. In place of the filter, which is colored, I may utilize a prism or a difraction grating, as is self-evident. In the showing of the present invention, I have provided four field lens assemblies, containing the elements just named, two of which are horizontal assemblies, as shown in Figure 1 at 6 and 7, and two of which are vertical assemblies, as shown at 8 and 9. Figure 4 diagrammatically illustrates the horizontal assemblies, and the axis of each field lens 2 of each assembly is parallel to the axis of the main objective 1. In the case of the horizontal assemblies, said assemblies are relatively offset, both vertically and horizontally, as shown in Figures 3 and 4. Thus, the assembly at 7 is slightly forwardly of and above the assembly at 6. The arrangement of the assemblies at 6 and 7 is such that the distance between the axes of the two field lenses closely approximates the pupillary distance between the eyes of a human being. The prisms are positioned so that at full aperture, light through each set of prisms of the two assemblies 6 and 7 covers more than one-half of the field in the objective focal plane on opposite sides of the objective axis 10, the focal plane being indicated at 11. Means is indicated at 12, rearwardly of the main objective 1, for controlling the aperture for said objective, and it is intended that at the smallest aperture at which said objective is designed to be used, only the edges of the field are still covered by light through the field assemblies, shown at 6 and 7.

The vertical assemblies 8 and 9 may have the axes thereof further apart than the axes of the assemblies shown at 6 and 7, it being essential, however, that the axis of each field lens assembly should be parallel and the vertical assemblies may be in alignment and not offset, as is the case for the horizontal assemblies. The vertical assemblies, as stated, contain the same elements, to wit: a filter, a field lens and two right angle prisms, and which assemblies at full aperture pass light through the vertical assembly prisms to cover slightly less than one-half the field on opposite sides of the axis 10. Thus, the horizontal assemblies cover slightly more than one-half the field, while the vertical assemblies cover slightly less than one-half the field, using the axis 10 as a reference point.

The field lenses of the four assemblies cause secondary images, which are out of focus, at the focal plane of the main objective. As a result, the field lenses must have proper focal length with reference to their positions and the focal length of the main objective 1. Furthermore, the secondary images formed by the field assemblies must have a focal plane for the secondary images located somewhere between the second principal plane of the main objective 1, and the focal plane 11 of the objective. This is illustrated in Figure 6, wherein the light rays are shown both for the main objective 1 and for one of the field lens assemblies. It will be seen from this figure that the focus for the main objective is at the focal plane 11, while the secondary image focal plane is situated at 13. The distance forwardly of the secondary image focal plane is not critical, save and except that the secondary images must be completely blurred, and must not cause distortion in the main image on the focal plane at 11. This blurring effect for the secondary images, of course, refers to such image as is received on the focal plane of the objective 1. The range of usable focal lengths for the field or secondary lenses may be readily calculated, and by way of example, and again referring to Figure 6, if I designate $f^1$ as the focal length of a field lens; "$f$" as the focal length to the objective 1; "$s$" as the distance from the second principal plane of the objective 1 to the secondary image focal plane, and "$d$" as the optical distance of separation between the field lens and the objective, considering the planes thereof, then the distance "$s$" from the second principal plane of the objective 1 to the point where the secondary image is formed by the combination of the field lens and objective is given by the formula:

$$s = \frac{f(d-f^1)}{d-f^1-f}$$

For example, if $f-=7.5$ cm., $d=5.0$ cm. and it is desired that the secondary image be formed 1,5 cm. in front of the focal plane of the objective, then the proper value of $f-$ can be readily found:

$$s = f - 1.5 = 7.5 - 1.5 = 6.0 \text{ cm.}$$

Substituting in the formula:

$$6.0 = \frac{7.5(5.0-f^1)}{5.0-f^1-7.5}$$

$$f^1 = +35 \text{ cm.}$$

It is apparent from the description so far given, that I obtain the conditions just stated through the use of positive lenses, and if negative field lenses are employed, the secondary images are behind the focal plane of the objective 1. As these do not give as good an effect as the positive field lenses, I prefer to use positive field lenses.

The prisms employed with each field lens assembly are such as to cover one-half field of the objective 1 at full aperture. The sizes and positions of the field lenses and color filters are based on the same consideration with the addition, in the case of the field lenses, that the focal lengths and positions are such as to produce the secondary images forwardly of the focal plane of the objective.

So far as the filters for each field lens assembly are concerned, different filter combinations may be utilized or each filter of the several assemblies may be of a different color, such as red, blue, green or a combination thereof, so that the entire visible color spectrum is utilized. Thus, the horizontal field lens assemblies 6 and 7 may comprise red for assembly 6, blue for assembly 7, or the said assemblies may be of multiple color type filters, divided into separate portions of red, green and blue. This is true likewise, for the vertical field lens assemblies, shown at 8 and 9.

The operation, uses and advantages of the invention just described are as follows:

The combination of the field lenses, together with the objective 1 is of course, used for the camera, and as stated in the objects, the resultant film positive, which is to be projected, may utilize a standard projector, the picture being projected onto a standard flat screen.

For some time past, the effect of color in obtaining a stereoscopic effect has been known. E. Grimsehl, in an article appearing in the British Journal of Photography, in 1908; 56, 328; pointed out that if an obliterated German 10 pfennig red stamp is examined with both eyes through a magnifying glass of 4 inch diameter, the obliteration appears to stand about two or three millimeters above the plane of the paper. This does not appear with a 5 pfennig green stamp; hence the effect is due to the color of the stamp. This effect does not appear when a black letter is drawn on a piece of red paper, only when the letter is drawn in red on white, that is, a fine network of red lines on white paper, with a black design. It is especially noticeable with a wide-mesh net, having parts of the letter lying on the red lines, whereas those parts lying in between on the white ground appear sunken. E. Grimsehl stated that if a series of concentric circles are drawn alternately with green or blue, black, red, etc. ink without white inter-spaces, then viewed with binocular vision through a reading glass, that the green will appear sunken in. The black circles appear also to be raised where their edges touch the red, and sunken in where they touch the green. This phenomenon is said to be due to the chromatic aberrations which the rays experience as they pass the edges of the glass. This, however, does not explain the fact that when a large number of black, green and red dots are made on a sheet of white paper in irregular arrangement, about two millimeters apart, that upon examination through a reading glass, the green dots appear in front, behind them are the black, and further off still, the red. In three-color prints, made with a coarse screen, the three colors appear, when examined through a glass, to be in different planes, the red on top, then the yellow, and finally the blue, each being one to two millimeters from each other. If two separate reading glasses are used, of about 12 centimeters focus, one for each eye, the effect is reversed. On looking through the center of the lenses, there is no stereoscopic effect, only when the edges are used. M. von Rohr, in Phys. Zeits. 1908, 201, which article also appeared in the British Journal of Photography 1908, 56, 328, asserted that the explanation of the phenomenon is that actually each eye looks through a prism, the refractive angle of which is towards the temples of the observer. If any dark spot on a white ground is examined with one eye through a prism, held in the same way, the image will be seen displaced, and surrounded by colored fringes, the result of the dispersion of the rays from the white ground with a blue fringe on the nasal side, and a red fringe on the temporal side. If the spots on a dark ground be observed with the naked eye, the red spots will appear more distance than the blue ones, which is due to the non-achromatism of the eye.

While in the present instance, I do not show the use of color film at the focal plane of the objective, still the principal remains the same, whether the picture is in black and white or in color, and what is obtained by the practice of the present invention is a depth effect, commonly called stereoscopic, or three-dimensional, and hence the reason for the use of color filters in conjunction with the field lenses, which pass light through the objective 1 in the proportion of slightly greater than one-half of the field of the focal plane 11 for the horizontal field lens assemblies, and slightly less than one-half the field of the objective 1 for the vertical field assemblies.

It is demonstrable with the present invention that the addition of color to the secondary images caused by the field lens assemblies is a slight net increase in the speed of photographing an object, and the off-setting of the rays from the field lens assemblies, particularly by the prisms, serves to bring light to the focal plane 11 from proper angles to create the effect of separation. As illustrated in Figure 7, it is essential that the secondary images, indicated at 14, be barely undiscernible. This condition also gives the optimum intensity of illumination.

The field lens assemblies brighten the main image, and that the coverage of the objective 1 by the prisms of the assemblies stops down the objective at large apertures, and thereby increases depth of field in the images formed by the objective 1. As previously pointed out, the prisms in the horizontal plane should be as close to the axis 10 as possible, without vignetting the field at small apertures. The field lens assemblies that lie horizontally, to wit: the assemblies 6 and 7, are very important because of separation effect, it being remembered that the eyes of a human being are separated horizontally. Furthermore, the offsetting of the rays by the several prisms of the field assemblies serve to bring light to the focal point from proper angles to create the effect of separation, and said offset images so formed are necessary to give roundness and depth to the main image.

I have previously pointed out that the focal plane of the secondary images may be anywhere between the second principal plane of the objective 1, and the focal plane 11 of the objective 1, provided there is no distortion in the main image. As previously pointed out, it is advantageous to use red and blue filters in the horizontal sub-assemblies. However, I have obtained improved separation by compounding, in strips, three different colors, such as blue, green and red in the horizontal field assemblies.

I have been unable to discover any specific effect obtained in the emulsion of a negative, such as differential exposure with depth, using my lens system. As a result, normal prints made from the negative retain the three-dimensional effect inherent in the negative. The horizontal and vertical field assemblies, providing as they do offset, out-of-focus secondary images and color, have been found to enhance light and shadow effects, give the feeling of depth and separation between images of objects at different distances, and these effects obtain for objects at great distances as well as for objects in close proximity, and those at intermediate distances, simultaneously. In the main, it is my opinion that the multi-colored secondary images come to the focal plane from different angles, both horizontally and vertically, and as a result, remove all sense of flatness and create a three-dimensional image under good lighting conditions.

I claim:

1. A lens mount including five lenses, one an objective lens and the other four lenses being secondary lenses located respectively above, below and on both sides of the main objective, said secondary lenses being in pairs vertically and horizontally, the two lenses of the horizontal pair being offset with respect to each other, both horizontally and vertically, and each having a color filter in front of the secondary lens, the color filters being of different colors and each of the lenses of the horizontal pair having between them and the main objective reflecting means for reflecting light rays from the two secondary lenses of the horizontal pair through the main objective; the two secondary lenses of the vertical pair each having a color filter in front of the lens and reflecting means for reflecting light rays from the secondary lens through the main objective; the secondary lenses being spaced apart so that the light from the horizontal pair of secondary lenses will cover more than one half of the field in the objective focal plane on opposite sides of the objective axis and the vertical pair of secondary lenses are spaced so that at full aperture they pass light to cover slightly less than one half of the field on opposite sides of the objective axis.

2. The lens mount of claim 1 in which at least three of the secondary lenses have different focal lengths.

3. The lens mount of claim 1 in which the reflecting means between each of the secondary lenses and the main objective lens is a series of prisms and the prisms are located as close to the axis of the main objective as is possible without vignetting.

References Cited in the file of this patent

UNITED STATES PATENTS

| | | |
|---|---|---|
| 1,454,218 | Folmer | May 8, 1923 |
| 1,482,069 | Douglass | Jan. 29, 1924 |
| 1,595,984 | Ames | Aug. 17, 1926 |
| 2,045,093 | Newcomer | June 23, 1936 |
| 2,360,322 | Harrison | Oct. 17, 1944 |
| 2,568,327 | Dudley | Sept. 18, 1951 |
| 2,596,129 | Cristiani | May 13, 1952 |

FOREIGN PATENTS

| | | |
|---|---|---|
| 745,942 | France | Feb. 27, 1933 |
| 808,158 | France | Nov. 6, 1936 |